US010360039B2

(12) United States Patent
Johnson et al.

(10) Patent No.: US 10,360,039 B2
(45) Date of Patent: Jul. 23, 2019

(54) PREDICTED INSTRUCTION EXECUTION IN PARALLEL PROCESSORS WITH REDUCED PER-THREAD STATE INFORMATION INCLUDING CHOOSING A MINIMUM OR MAXIMUM OF TWO OPERANDS BASED ON A PREDICATE VALUE

(75) Inventors: Richard Craig Johnson, Cary, NC (US); John R. Nickolls, Los Altos, CA (US); Robert Steven Glanville, Cupertino, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 811 days.

(21) Appl. No.: 12/891,629

(22) Filed: Sep. 27, 2010

(65) Prior Publication Data
US 2011/0078415 A1    Mar. 31, 2011

Related U.S. Application Data

(60) Provisional application No. 61/246,509, filed on Sep. 28, 2009.

(51) Int. Cl.
*G06F 9/30* (2018.01)
*G06F 9/38* (2018.01)

(52) U.S. Cl.
CPC .......... *G06F 9/3851* (2013.01); *G06F 9/3004* (2013.01); *G06F 9/3012* (2013.01);
(Continued)

(58) Field of Classification Search
CPC .................. G06F 9/30094; G06F 9/3887; G06F 9/30072
See application file for complete search history.

(56) References Cited

U.S. PATENT DOCUMENTS 5,859,999 A * 1/1999 Morris et al. .................. 712/224
6,973,521 B1 * 12/2005 Indiresan ................ G06F 9/526
710/200
(Continued)

FOREIGN PATENT DOCUMENTS

CN    101231585 A    7/2008
CN    101373427 A    2/2009

OTHER PUBLICATIONS

NVIDIA (NVIDIA Compute—PTX: Parallel Thread Execution—ISA Version 1.2); Jun. 17, 2008; 105 pages.*
(Continued)

*Primary Examiner* — Keith E Vicary
(74) *Attorney, Agent, or Firm* — Artegis Law Group, LLP

(57) ABSTRACT

A mechanism for predicated execution of instructions within a parallel processor executing multiple threads or data lanes is disclosed. Each thread or data lane executing within the parallel processor is associated with a predicate register that stores a set of 1-bit predicates. Each of these predicates can be set using different types of predicate-setting instructions, where each predicate setting instruction specifies one or more source operands, at least one operation to be performed on the source operands, and one or more destination predicates for storing the result of the operation. An instruction can be guarded by a predicate that may influence whether the instruction is executed for a particular thread or data lane or how the instruction is executed for a particular thread or data lane.

16 Claims, 7 Drawing Sheets

(52) U.S. Cl.
 CPC ........ *G06F 9/3013* (2013.01); *G06F 9/30021* (2013.01); *G06F 9/30029* (2013.01); *G06F 9/30072* (2013.01); *G06F 9/30087* (2013.01); *G06F 9/30094* (2013.01); *G06F 9/3885* (2013.01); *G06F 9/3887* (2013.01); *G06F 9/3889* (2013.01)

(56) References Cited

U.S. PATENT DOCUMENTS

| | | | |
|---|---|---|---|
| 7,191,317 B1* | 3/2007 | Wilson | 712/224 |
| 2002/0038403 A1* | 3/2002 | Wolrich | G06F 9/52 711/104 |
| 2004/0088526 A1 | 5/2004 | Colavin et al. | |
| 2005/0081017 A1 | 4/2005 | Rupley et al. | |
| 2005/0219422 A1 | 10/2005 | Dorojevets et al. | |
| 2005/0251661 A1 | 11/2005 | Uguen et al. | |
| 2007/0124722 A1* | 5/2007 | Gschwind | G06F 8/445 717/106 |
| 2008/0016320 A1 | 1/2008 | Menon et al. | |
| 2008/0040586 A1 | 2/2008 | Colavin et al. | |
| 2008/0184211 A1* | 7/2008 | Nickolls et al. | 717/140 |
| 2009/0006816 A1 | 1/2009 | Hoyle et al. | |
| 2009/0240860 A1* | 9/2009 | Coon | G06F 9/526 710/200 |
| 2009/0240895 A1 | 9/2009 | Nyland et al. | |
| 2009/0240920 A1 | 9/2009 | Muff et al. | |
| 2012/0036329 A1* | 2/2012 | Coon | G06F 9/526 711/152 |

OTHER PUBLICATIONS

International Search Report, PCT Appl. No. PCT/US 10/50588, dated Jan. 21, 2011.

EPO Search Report dated May 10, 2013, European Application No. 10819659.3.

* cited by examiner

US 10,360,039 B2

PREDICTED INSTRUCTION EXECUTION IN PARALLEL PROCESSORS WITH REDUCED PER-THREAD STATE INFORMATION INCLUDING CHOOSING A MINIMUM OR MAXIMUM OF TWO OPERANDS BASED ON A PREDICATE VALUE

CROSS-REFERENCE TO RELATED APPLICATIONS

This application claims benefit of U.S. provisional patent application entitled "Efficient Predicated Execution for SIMT and SIMD Processor Architectures," filed on Sep. 28, 2009 and having a Ser. No. 61/246,509.

BACKGROUND OF THE INVENTION

Field of the Invention

The present invention relates generally to the field of parallel processing and, more specifically, to efficient predicated execution for parallel processors.

Description of the Related Art

Predicated execution is a mechanism for conditionally executing individual instruction operations, typically by conditionally committing or ignoring the results of executing an instruction, and thereby provides an alternative to conditional branching. In parallel processors, such as single-instruction multiple-thread (SIMT) and SIMD parallel processors where groups of parallel threads or data lanes execute a common instruction stream, predicated execution in each thread or data lane can greatly improve performance over divergent branching code where each thread of a thread group can independently take a different execution path.

In prior parallel processor designs, predicated execution within each thread or data lane makes use of a set of 4-bit condition code (CC) registers for each thread or lane instance, and instructions have a guard comprising several instruction bits to select one of the CC registers and additional bits to encode the comparison condition; a guarded instruction commits its result(s) for a thread or lane only if the condition for that thread or lane evaluates to True and is nullified otherwise. Additionally, many instructions optionally write to a CC register for each thread or data lane, requiring several instruction bits to encode the destination CC register plus one bit to enable/disable the register write operation.

As an example, a prior SIMT parallel thread processor has four 4-bit CC registers per thread, so instruction guards comprise seven bits: two bits to select one of four CC registers and five bits to encode the comparison test. There are 24 possible tests of the CC register. For instructions that optionally write a CC register, three bits are needed to encode the destination CC register and write-enable.

One problem with the prior approach is cost, both in terms of per-thread state (16-bits per thread for four CC registers) and instruction encoding space (7 bits per instruction for the guarding condition, plus 3 bits per instruction for any instruction that writes a CC register). Note that nearly every instruction must have a guard field, so reducing the encoding cost is a major concern. The 16-bits per-thread cost of CC registers is multiplied by the number of parallel threads or data lane instances, typically hundreds per SIMT or SIMD parallel processor, and is further multiplied by the number of parallel processors, which can number in the tens per chip. Per-thread register state costs chip area and power.

As the foregoing illustrates, what is needed in the art is a mechanism for minimizing per-thread state associated with predicated execution, minimizing instruction encoding bits required for predicated execution, and minimizing the number of instructions and cycles required to implement predicated execution.

SUMMARY OF THE INVENTION

One embodiment of the present invention sets forth a method for accessing predicate information associated with a thread group. The method includes the steps of receiving a first instruction for execution by the thread group, where the first instruction specifies a first source operand identifier, an operation, and a first destination predicate identifier, for each thread in the thread group, computing a predicate result by applying the operation to data in a first source operand identified by the first source operand identifier, and storing the predicate result in a first predicate register associated with the thread and identified by the first destination predicate identifier, where the first source register and the first predicate register are different for each thread in the thread group.

Advantageously, the invention described herein provides a mechanism for cost efficient predicated execution that minimizes the per-thread state in SIMT/SIMD parallel processors. In addition, optional negation of predicates further saves additional bits per-thread that would otherwise be needed to store negated predicates. Further, efficient code can be generated for conditional program regions of parallel multithreaded programs.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
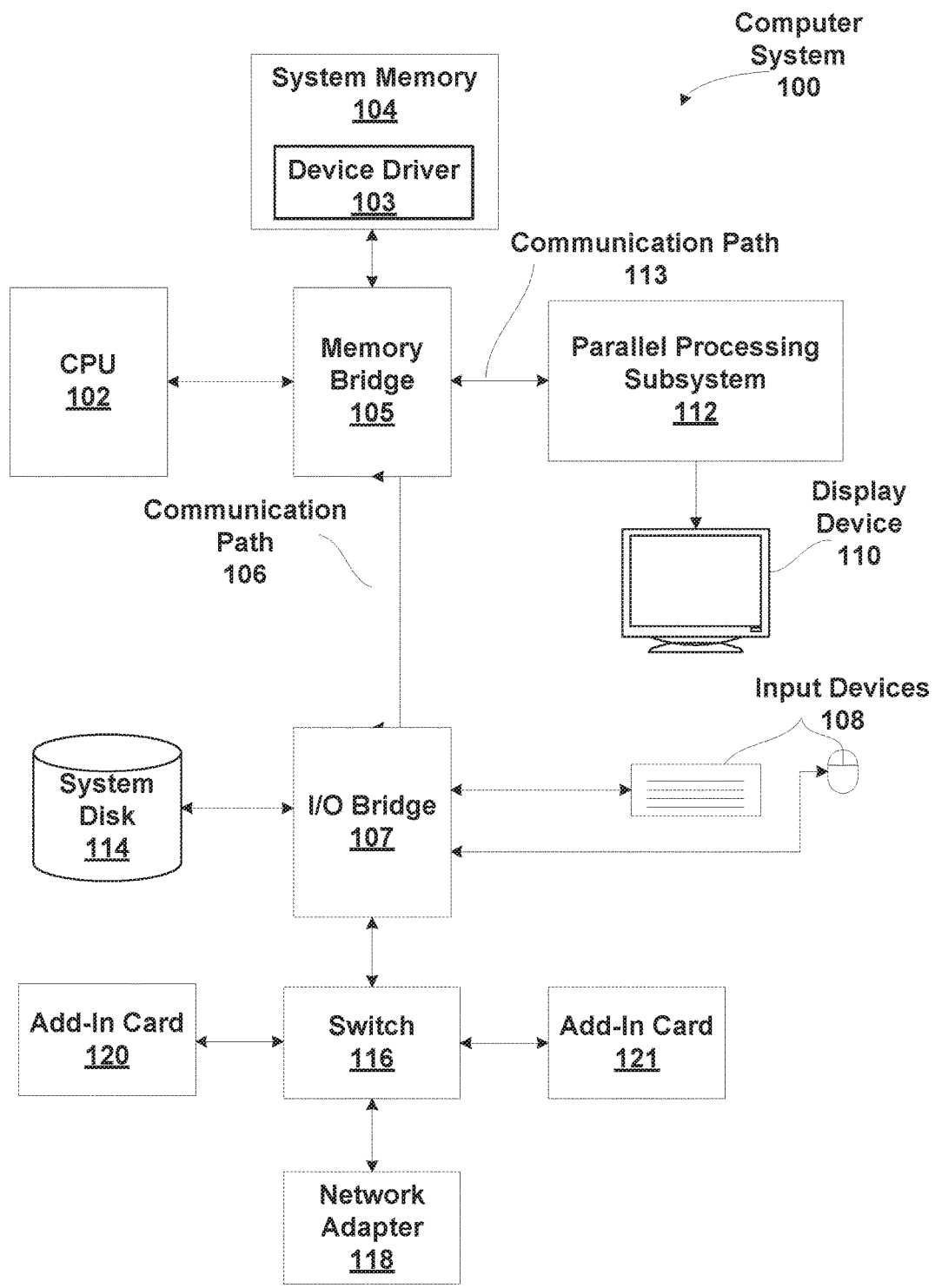
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
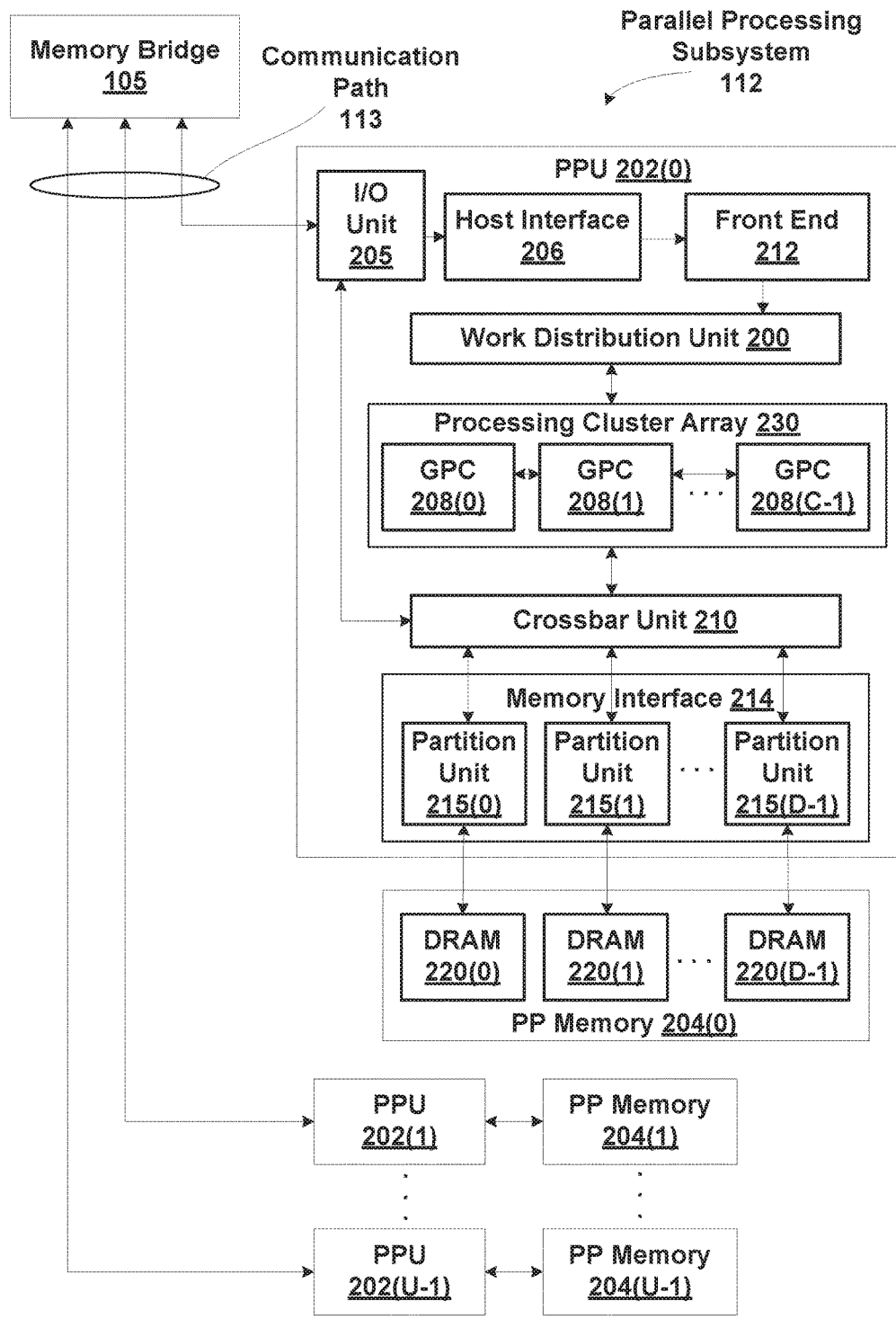
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
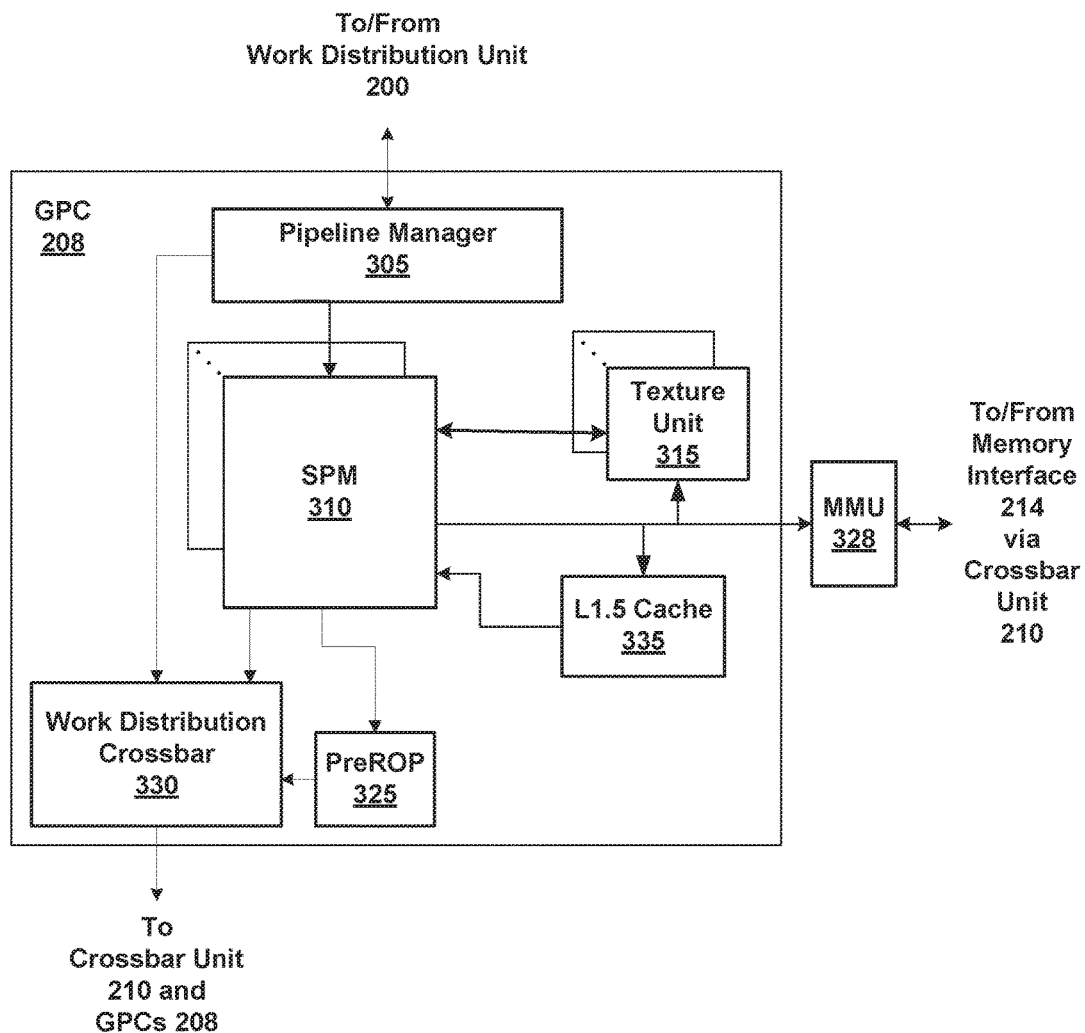
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to SIMT parallel thread processors called streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M1, each SPM 310 configured to process one or more thread groups. Also, each SPM 310 advantageously includes an identical set of functional execution units (e.g., arithmetic logic units, and load-store units, shown as Exec units 302 and LSUs 303 in FIG. 3C) that may be pipelined, allowing a new instruction to be issued before a previous instruction has finished, as is known in the art. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache 375 or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
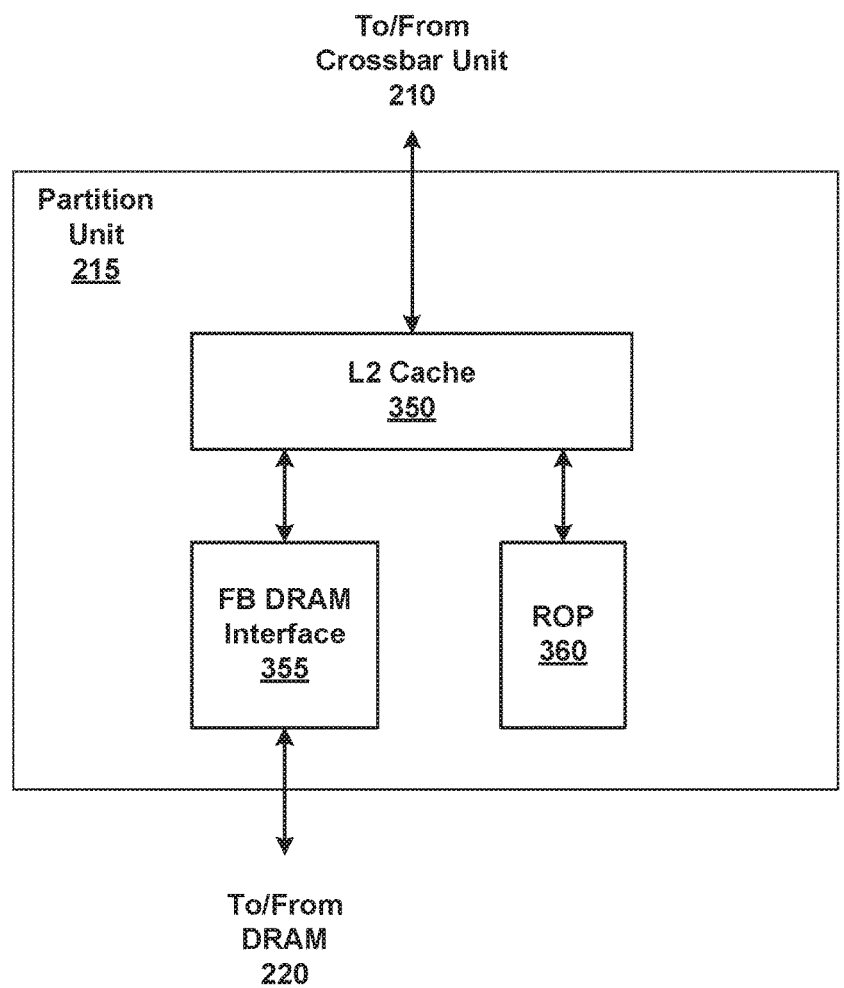
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value value, controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
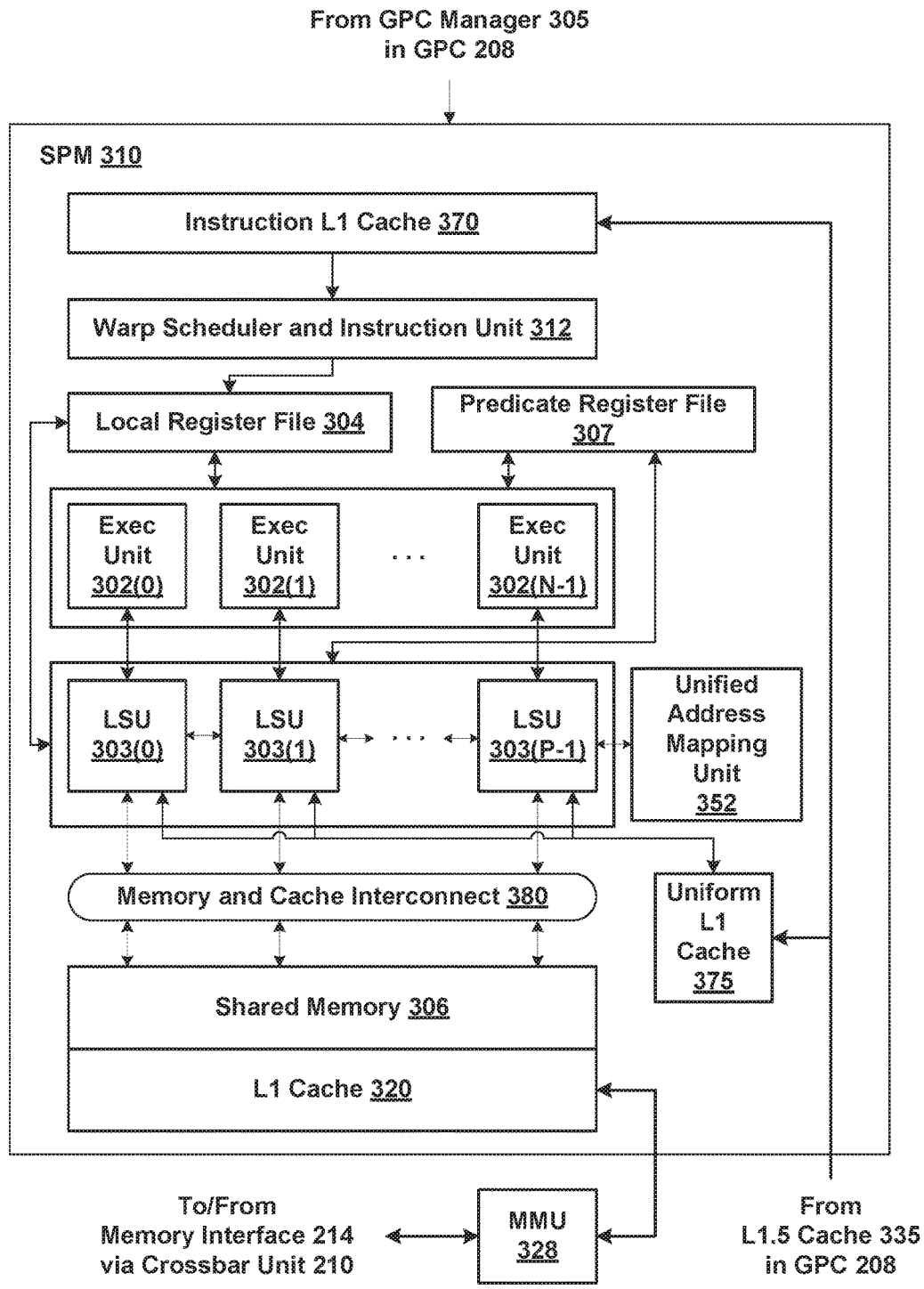
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Predicate register file 307 includes predicate registers for each CTA thread. Predicate register file 307 is described in greater detail below with respect to FIGS. 4 and 5.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect 380 that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

Predicated Instruction Execution for a Parallel Processor

The discussion set forth below is directed to a parallel processor that executes parallel threads or parallel data lanes. In some embodiments, groups of parallel threads or parallel data lanes execute a common instruction stream, using SIMT or SIMD techniques. An embodiment using SIMT techniques is described that provides explicitly a predicate register comprised of 1-bit predicates for each thread executing in the parallel processor. A general set of instructions for setting and using the 1-bit predicates are also described. Advantageously, the predicate register architecture described below reduces thread state and instruction encoding overhead and requires fewer instructions to implement conditional program regions.

Figure 4:
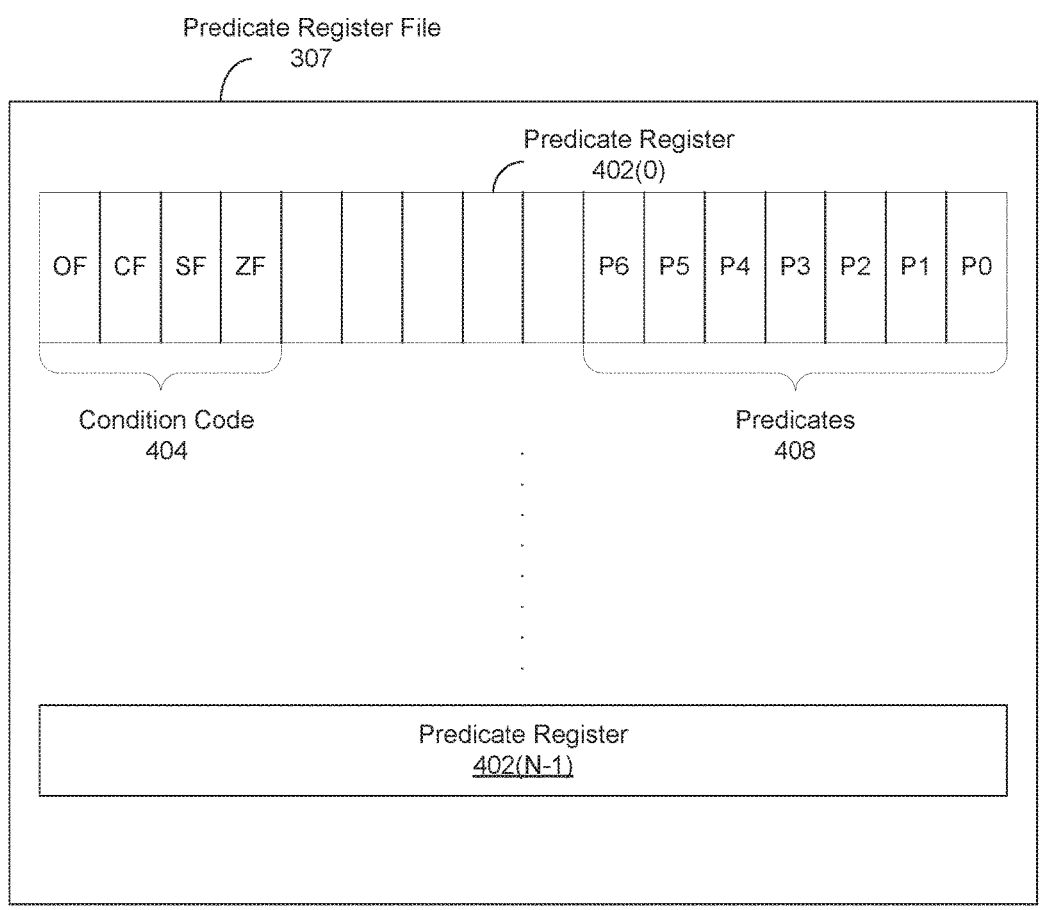
FIG. 4 is a more detailed diagram of the predicate register file of FIG. 3C, according to one embodiment of the present invention.

FIG. 4 is a more detailed diagram of the predicate register file 307 of FIG. 3C, according to one embodiment of the present invention. As shown, the predicate register file 307 includes N different predicate registers 402. Each predicate register 402 is associated with a different thread executing within the SPM 310 on the execution units 302. For the purpose of discussion only, predicate register 402(0) is described below in greater detail. Predicate register 402(0) includes a condition code 404 and predicates 408.

The condition code 404 comprises four 1-bit condition code flags: OF (overflow flag), CF (carry flag), SF (sign flag), and ZF (zero flag). Within each thread the condition code may be optionally written by instructions; the condition code is typically written by integer and floating-point arithmetic instructions to indicate properties of the arithmetic result. The predicates 408 comprise seven 1-bit predicates that can be used by the thread associated with the predicate register 402(0). Each of the predicates P0-P6 in predicates 408 indicates one bit of state associated with the thread, where a value of 0 for a predicate indicates False and a value of 1 indicates True. In addition to predicates P0-P6, a reserved instruction encoding for a True predicate, PT, whose value is always 1 is provided. Predicate PT does not require any per-thread state. Predicate PT may be used as an instruction source operand when a constant True predicate value is needed, and as an instruction destination operand when an instruction has no live-out predicate result; writes to PT are ignored.

For each thread executing in the SPM 310, corresponding predicates in the predicate register 402 are set via predicate-setting instructions. The following discussion describes six different types of predicate-setting instructions that are used to set predicates in the predicate registers 402 for each thread executing in the SPM 310.

ISETP, FSETP and DSETP are three different predicate-setting instructions. In their simplest form, each of these instructions sets a Boolean predicate associated with the thread to True or False by evaluating one or more source operands. Source operands can be general purpose registers within the local register file 304, immediate values, or constant values. A simple example tests one source operand value and sets a predicate to False if the source operand is zero, otherwise sets the predicate to True. More generally, each of these instructions applies an operation to one or more source operands that yields a Boolean result. A test operation evaluates one source operand by comparing it with zero. A comparison operation compares at least two source operands and stores the Boolean result(s) of the comparisons in one or more predicates within the predicate register 402. The different comparisons that may be specified by a predicate-setting instruction include less than, greater than, equal to, not equal to, etc. Any other technically feasible comparison between two values is within the scope of the present invention. Importantly, a Boolean result of a comparison may be different for each thread executing the predicate-setting instruction and, thus, the Boolean result stored in the predicate registers 402 corresponding to different threads may be different.

An ISETP instruction compares two source operands (e.g. general-purpose registers, immediate operands, or constants) representing integer values to generate a Boolean result. An FSETP instruction compares two source operands representing single-precision floating point values to generate a Boolean result. The source operands of an FSETP instruction can be specified with different options such as "with negation sign" and "absolute value." A DSETP instruction compares two source operands representing double-precision values to generate a Boolean result. An example ISETP predicate-setting instruction used to implement the if-then-else statement is:    if (R0<R1) then { A; } else { B; }
      ISETP.lt P2,R0,R1;       # P2=(R0<R1 ? 1 : 0)

When this instruction is executed for a particular thread, the integer values stored in registers R0 and R1 associated with the thread are compared. Specifically, the "lt" (less than) comparison is applied to R0 and R1. The Boolean result of the comparison is stored in the P2 predicate within the corresponding predicate register 402 associated with the thread. Branch instructions to implement statements A and B can then be predicated on P2 being True or False, or the branches can be eliminated with a transformation to predicated instructions known as if-conversion. Instructions implementing statement A can be predicated on P2 being True, while instructions implementing statement B can be predicated on P2 being False.

Predicate-setting instructions can also be used for setting multiple predicates with multiple or compound Boolean functions. For example, setting multiple predicates based on compound Boolean functions is useful for if-conversion of nested if-then-else structures and for evaluating compound Boolean expressions. To generate efficient code in these cases, the SETP instructions include an optional predicate source operand and Boolean function. The predicate source operand may be optionally negated.

Several predicated code schemas require computing pairs of related predicates. For example, in a simple nested if-then-else structure, a pair of predicates is needed to guard the then and else blocks in the nested statement. Consider if-conversion of the following nested if-then-else structure:

if (R0<R1) then {A;} else {if (R2>R3) then {B;}
        else {C;}}

Instructions in block A are executed if the first condition, R0<R1, is True. Instructions in block B are executed only if the first condition, R0<R1, is False and the second condition, R2>R3, is True; instructions in block C are executed only if the first condition, R0<R1, is False and the second condition, R2>R3, is also False. The corresponding guard conditions are computed easily using SETP instructions:

| ISETP.lt     | P1,R0,R1;     | # P1 = (R0<R1)       |
| ISETP.gt.and | P2,R2,R2,!P1; | # P2 = !P1 & (R2>R3) |
| ISETP.le.and | P3,R2,R3,!P1; | # P3 = !P1 & !(R2>R3) |

In addition, the number of SETP instructions needed in predicated code can be reduced when the SETP instructions are extended to store results within two different predicates of the predicate registers 402. The second Boolean result is computed much the same as the first Boolean result, except that the complement of the comparison is used. In the above example, P2 and P3 can be computed by a single ISETP instruction that sets two destination predicates with two Boolean operations:

| ISETP.lt     | P1,R0,R1; |
| ISETP.gt.and | P2,P3,R2,R3,!P1; # P2=(R2>R3)&!P1; P3=!(R2>R3)&!P1 |

PSETP, CSETP and VSETP are three additional predicate-setting instructions. PSETP instructions allow for performing general Boolean functions on predicates. A PSETP instruction specifies two or more predicate source operands within the predicate register 402, one or more comparison operations and one or more destination predicates within the predicate register 402. For example, a PSETP instruction PSETP.bop0.bop1 Pu, Pv, {!}Pp, {!}Pq, {!}Pr;

sets two destination predicates Pu and Pv within the predicate register 402 to Boolean values based on the compound Boolean operations bop0 and bop1 of optionally negated source predicate operands Pp, Pq, and Pr:

Pu = ( {!}Pp bop0 {!}Pq ) bop1 {!}Pr;
    Pv = ( (!{!}Pp) bop0 {!}Pq) bop1 {!}Pr;

A CSETP instruction, when executed, tests a condition code (CC) register with a specific test, combines the Boolean result with predicate operand Pp using a specific Boolean operation bop and sets one or more destination predicates within the predicate register 402 based on the test. The test may include signed numeric tests, signed or unordered tests, and unsigned integer tests.

A VSETP instruction, when executed, extracts a sub-word (a byte or a short) or word values from one or more source registers specified in the VSET instruction, sign extends the values to 33-bit signed values and performs a specified comparison to produce a Boolean intermediate result. The intermediate result is then combined with an optionally negated predicate source operand using a specified Boolean operation and one or more destination predicates within the predicate register 402 are set based on the results. VSETP is useful when working with signed or unsigned integer word or subword values, such as in media processing algorithms.

The different predicate setting instructions described above have corresponding general purpose register setting instructions, such as ISET, FSET, PSET, etc. As with the predicate setting instructions, these instructions compute a Boolean result, but the result is converted to a 32-bit value which is stored within one or more general purpose registers of the local register file 304. The 32-bit value may be an integer value or a single precision floating point value, determined by the instruction's result format type. When integer results are selected, Boolean results 0 and 1 are converted into integer values 0x0000000 and 0xFFFFFFFF, respectively. When floating-point results are selected, Boolean results 0 and 1 are converted into single precision floating point values 0.0f and 1.0f, respectively.

The P2R instruction copies the predicate register 402 into the low or high half portion of a 32-bit register within the local register file 304. This instruction includes a mask operand that allows a subset of the bits to be written to the general-purpose register. This is useful for implementing register allocation and function calling conventions. The R2P instruction copies selected bits from a low or high half portion of a general-purpose register under control of a mask into the predicate register 402.

Instructions executed within the SPM 310 have a guard predicate that controls conditional execution of the instructions in each thread. A guard predicate corresponds to a predicate within the predicate register 402 associated with each thread. If the guard predicate for a thread is true (has a value of 1), the instruction is executed normally by that thread. If the guard predicate for that thread is false (has a value of 0), the instruction is nullified for that thread and has no effect on machine state for that thread.

The guard predicate may be optionally negated, so four instruction bits are needed to encode the guard predicate selecting one of seven predicates or PT for each instruction. Instructions may be executed unconditionally by guarding with predicate PT. The guard condition is written to the left of each instruction using the syntax "@Px" or "@!Px".

Examples of predicated instructions for one thread:

| | | |
|---|---|---|
| @P2 | IADD R1,R2,R3; | # executes if P2 true, else nullified |
| @PT | IMUL R2,R4,R6; | # executes unconditionally |
| @!P1 | FMAX R1,R2,R3; | # executes if P1 false, else nullified |

The most common uses of predication are to eliminate short forward branches and eliminate simple, single-level if-then-else structures. For these common cases, negate-on-use reduces the number of live predicate registers by up to half. This reduction in state is especially advantageous for SIMT and SIMD parallel processors which have many threads and thus many instances of per-thread state.

To eliminate branches in more complicated control flow regions such as nested if-then structures more general predicate conditions are computed. For example, consider the following code:

if (p) then {A;} else {if (q) then {B;} else {C;}}

When condition p is true, A should execute and both B and C should be nullified. Attempting to guard B and C with a predicate and its complement, say q and !q respectively, leads to one of them being executed incorrectly even when p is true. The correct guard for B is (!p & q) and for C is (!p & !q), using C language syntax. These guards can be computed efficiently with a single SETP instruction having two destination predicates.

In addition to guarded (predicated) computational instructions (e.g. arithmetic, logical, memory load/store operations), predicates are used to guard control flow altering instructions such as conditional and predicated BRA, BRX, JMP, and JMX. The branch/jump condition is based on either a guard predicate, a test of a condition code register, or a combination of both.

Predicates are also used in SEL instructions, MNMX instructions, VOTE instructions and LDLK instructions. A SEL instruction selects either a first or a second source operand specified in the SEL instruction based on an optionally negated predicate within the predicate register 402. The selected operand is copied to a specified destination register.

The IMNMX, FMNMX, and DMNMX instructions choose the minimum or maximum of two source operands based on the value of an optionally negated predicate. For example, if, for a particular thread, the predicate specified in the MNMX instruction is false, then a minimum operation is performed on the two source operands. Conversely, if the predicate specified in the MNMX instruction is true, then a maximum operation is performed on the two source operands. The result of the selected operation is copied to a specified destination register.

The VOTE instruction performs a reduce-and-broadcast of predicates across all active threads in a thread group. The result of the vote operation is shared across all active threads in the thread group. The vote operations are .ALL (True iff the source predicate is true across all active threads), .ANY (true iff at least one source predicate is true across all active threads), and .EQ (true iff the source predicate is true across all active threads OR the source predicate is false across all active threads).

The load-and-lock instruction (LDLK) and load-shared-and-lock (LDSLK) instructions load a value from memory and attempt to acquire a lock associated with the memory address; these instructions write a predicate destination register to indicate whether the lock was acquired (writes True) or not (writes False).

Figure 5:
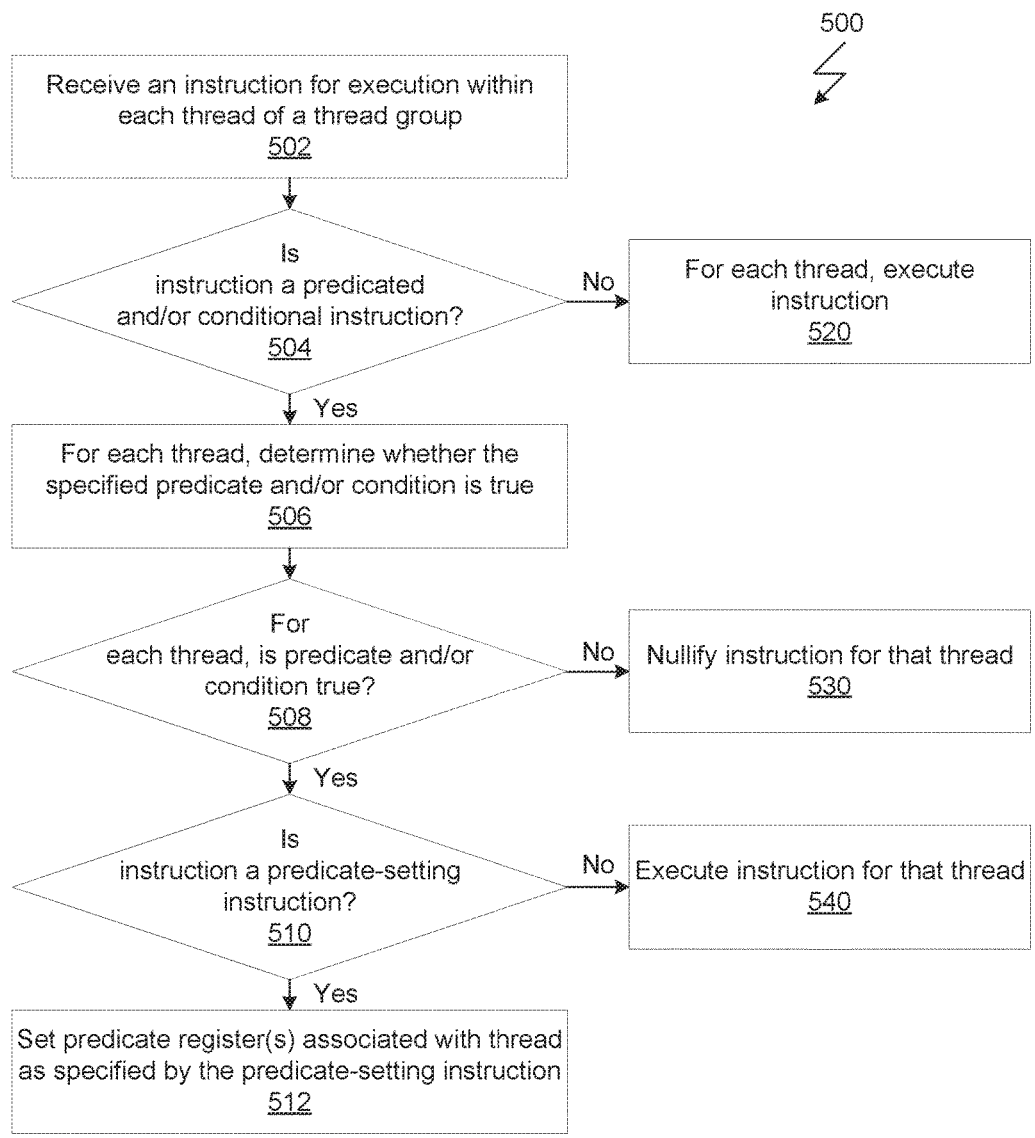
FIG. 5 is a flow diagram of method steps for setting predicates in the predicate register file and accessing predicates for conditional (predicated) instruction execution, according to one embodiment of the present invention.

FIG. 5 is a flow diagram of method steps for setting predicates in the predicate register file and accessing predicates for conditional instruction execution, according to one embodiment of the present invention. Although the method steps are described in conjunction with the systems for FIGS. 1-4, persons skilled in the art will understand that any system configured to perform the method steps, in any order, is within the scope of the invention.

The method 500 begins at step 502, where the SPM 310 receives an instruction for execution within each thread of a thread group. As previously described herein, each thread executes the same instruction with different source operands to generate different outputs. At step 504, the SPM 310 determines whether the instruction is a predicated and/or conditional instruction.

If the instruction is not a predicated and/or conditional instruction, then the method proceeds to step 520, where the instruction is executed unconditionally for each thread. If the instruction is a predicated and/or conditional instruction, then the method proceeds to step 506, where, for each thread, the SPM 310 determines whether the corresponding predicate(s) and/or the condition specified in the instruction are true. The method continues to step 508, where the guard predicate and/or branch condition is tested for each thread.

At step 508, for each thread, if the guard predicate and/or condition is False, the method continues to step 530 where SPM 310 nullifies the instruction for that thread. At step 508, if the guard predicate and/or condition is True, the method continues to step 510.

At step 510, if the instruction is a predicate-setting instruction, then the method proceeds to step 512, where, for each thread, one or more predicates within the predicate registers 402 are set based on the source operands and the comparison operation(s) specified by the instruction. Importantly, since the instruction is executed for each thread with different source operands, the values of the predicates may be different for each thread in the thread group. At step 510, if the instruction is not a predicate-setting instruction, then the method proceeds to step 540, where for each thread, the instruction is executed.

Advantageously, the invention described herein provides a mechanism for cost efficient predicated execution that minimizes the per-thread state in SIMT/SIMD parallel processors. In addition, optional negation of predicates further saves additional bits per-thread that would otherwise be needed to store negated predicates. Further, efficient code can be generated for conditional program regions of parallel multithreaded programs.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for accessing predicate information associated with a thread group, the method comprising:
   receiving a first instruction for execution by the thread group wherein the first instruction specifies a first source operand identifier, an operation, and a first destination predicate identifier;
   for each thread in the thread group,
      computing a predicate result by applying the operation to data in a first source operand included in a local register file and identified by the first source operand identifier, and
      storing the predicate result in a first predicate of a first predicate register included in a predicate register file and associated with the thread, wherein the first predicate is identified by the first destination predicate identifier, and the predicate register file is separate from the local register file and includes a different predicate register for each thread in the thread group,
      wherein the first source operand is different for each thread in the thread group and the first predicate register associated with the thread is different for each thread in the thread group; and
   receiving a first guarded instruction for execution by the thread group, wherein the first guarded instruction specifies the first destination predicate identifier and comprises a minimum/maximum instruction that specifies a third source operand identifier and a fourth source operand identifier; and
   for each thread in the thread group, executing the minimum/maximum instruction by:
      in response to the first predicate of the first predicate register being set to a first value, performing a minimum operation on data in a third source operand identified by the third source operand identifier and data in a fourth source operand identified by the fourth source operand identifier, and
      in response to the first predicate being set to a second value, performing a maximum operation on the data in the third source operand and the data in the fourth source operand.

2. The method of claim 1, wherein the operation compares the data in the first source operand with zero.

3. The method of claim 1, wherein the first instruction further specifies a second source operand and the operation compares the data in the first source operand with data in the second source operand.

4. The method of claim 3, wherein the first instruction further specifies a fifth source operand identifier and a combinatorial operation, and the step of computing a predicate result also includes applying the combinatorial operation to data in a fifth source operand identified by the fifth source operand identifier and a value associated with the comparison of the data in the first source operand and the second source operand.

5. The method of claim 4, wherein the fifth source operand comprises a predicate.

6. The method of claim 3, wherein the first predicate represents a first result of the operation.

7. The method of claim 3, wherein the first source operand and the second source operand comprise a predicate.

8. The method of claim 1, further comprising the step of receiving a second guarded instruction for execution by the thread group that specifies the first destination predicate identifier.

9. The method of claim 8, wherein the second guarded instruction comprises a select instruction that specifies a fifth source operand identifier and a sixth source operand identifier, and further comprising the step of, for each thread in the thread group, determining, based on the first predicate register, whether to select data in a fifth source operand identified by the fifth source operand identifier or data in a sixth source operand identified by the sixth source operand identifier.

10. The method of claim 8, wherein the second guarded instruction comprises a branch instruction that specifies a third instruction, and further comprising the step of, for each thread in the thread group, determining, based on the first predicate register, whether the third instruction should be the next instruction executed.

11. The method of claim 1, wherein the first predicate register further comprises a plurality of condition code bits.

12. The method of claim 11, further comprising:
   for each thread in the thread group,
      computing a condition code result by applying the operation to the data in a first source operand; and
      storing the condition code result in a third bit of the first predicate register associated with the thread, wherein the plurality of condition code bits includes the third bit.

13. The method of claim 1, wherein the first instruction is one of an ISETP, FSETP, DSETP, PSETP, CSETP, or VSETP instruction corresponding to a set predicate instruction for integer, single-precision floating point, double-precision floating point, predicate, condition code, and sub-word operands, respectively.

14. The method of claim 1, further comprising receiving a second instruction for execution by the thread group wherein the second instruction specifies that the first predicate register is to be copied into a first portion of a register within the local register file.

15. The method of claim 1, further comprising receiving a second instruction for execution by the thread group wherein the second instruction specifies that a first portion of a register within the local register file is to be copied into the first predicate register.

16. The method of claim 1, wherein computing the predicate result comprises:
   extracting a sub-word value from the first source operand;
   sign extending the sub-word value to generate a sign-extended value;
   performing a comparison operation associated with the sign-extended value to generate an intermediate result; and
   combining the intermediate result with a predicate source operand to generate the predicate result.

* * * * *

UNITED STATES PATENT AND TRADEMARK OFFICE
CERTIFICATE OF CORRECTION

PATENT NO. : 10,360,039 B2  
APPLICATION NO. : 12/891629  
DATED : July 23, 2019  
INVENTOR(S) : Richard Craig Johnson, John R. Nickolls and Robert Steven Glanville It is certified that error appears in the above-identified patent and that said Letters Patent is hereby corrected as shown below:

On the Title Page

(54) Title:
Please delete "PREDICTED INSTRUCTION EXECUTION IN PARALLEL PROCESSORS WITH REDUCED PER-THREAD STATE INFORMATION INCLUDING CHOOSING A MINIMUM OR MAXIMUM OF TWO OPERANDS BASED ON A PREDICATE VALUE" and insert --PREDICATED INSTRUCTION EXECUTION IN PARALLEL PROCESSORS WITH REDUCED PER-THREAD STATE INFORMATION INCLUDING CHOOSING A MINIMUM OR MAXIMUM OF TWO OPERANDS BASED ON A PREDICATE VALUE--.

Signed and Sealed this
First Day of October, 2019

Andrei Iancu
*Director of the United States Patent and Trademark Office*